United States Patent

Munekata et al.

[15] 3,669,998

[45] June 13, 1972

[54] CHLORO-NITRO SUBSTITUTED PHENYL ESTERS OF ALIPHATIC ACIDS

[72] Inventors: Takashi Munekata; Eizaburo Uchida, both of Iwaki-shi, Japan

[73] Assignee: Kureha Kagaku Kogyo Kabushiki Kaisha, Tokyo, Japan

[22] Filed: June 19, 1967

[21] Appl. No.: 647,195

[30] Foreign Application Priority Data

June 21, 1966 Japan....................................41/40254
March 14, 1967 Japan..................................42/16017
May 17, 1967 Japan....................................42/31333

[52] U.S. Cl..........................260/410.5, 260/471, 260/473, 260/476, 260/479, 424/308, 424/309, 424/311, 424/312, 424/314
[51] Int. Cl......................................C07c 69/24, C07c 69/62

[58] Field of Search........................260/479, 410.5

[56] References Cited

UNITED STATES PATENTS

| | | | |
|---|---|---|---|
| 3,097,230 | 7/1963 | Miller | 260/479 |
| 2,985,688 | 5/1961 | Mersch | 260/479 |
| 2,945,871 | 7/1960 | Murray | 260/479 |
| 2,833,825 | 5/1958 | Lewis | 260/479 |

FOREIGN PATENTS OR APPLICATIONS

38/8996   6/1963   Japan....................................260/479

*Primary Examiner*—Lorraine A. Weinberger
*Assistant Examiner*—Edward Jay Gleiman
*Attorney*—McGlew and Toren

[57] ABSTRACT

There are disclosed herein chloro-nitrophenyl esters of aliphatic acids having fungicidal activity.

12 Claims, No Drawings

CHLORO-NITRO SUBSTITUTED PHENYL ESTERS OF ALIPHATIC ACIDS

The present invention relates to novel chloronitrophenyl esters and to a process for their preparation.

The invention also relates to the method of use of said compounds as fungicides and to compositions containing said compounds. These compounds have excellent fungicidal properties, especially against Pyricularia oryzae and Cochliobolus miyabeanus which cause serious damage to rice crops.

The novel compounds of the present invention are chloronitrophenyl esters of organic acid of the following general formula (1):

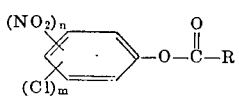
(1)

wherein R represents a radical selected from the group consisting of $C_2 - C_{20}$ alkyl, $C_2 - C_{20}$ alkenyl, $C_2 - C_{20}$ alkynyl, and substituted-alkyl, -alkenyl, -alkynyl, and substituted aryl, and substituted- and unsubstituted aralkyl, aralkenyl; n is an integer 1 or 2; m is an integer 4 when n is 1, or an integer 2 when n is 2.

The compound of the present invention can be prepared by reacting a compound selected from the group consisting of chloronitrophenols and alkali-metal chloronitrophenolates of the general formula (2) with a compound selected from the group consisting of organic acids of the general formula 3), of anhydrides and of acid-chlorides of the aforementioned organic acids, in the presence of, if necessary, one or more agents selected from the group consisting of dehydrochlorinating agents and dehydrating agents.

The above-mentioned reaction can be carried out, if necessary, in an inert organic solvent:

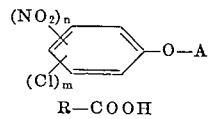
(2)

R—COOH (3)

wherein, "A" represents an atom selected from the group consisting of hydrogen, sodium and potassium.

n and m have the same meaning as above.

As mentioned above the compounds of the present invention have an advantage of having excellent fungicidal activities, especially against Pyricularia oryzae and Cochliobolus miyabeanus on rice plants, and also have another advantage of causing no phytotoxic effects to rice plants to which the compounds of the invention are applied.

In addition, the compounds of the present invention have remarkably lower mammalian toxicity; it is shown, for instance, by the fact that acute oral $LD_{50}$ of preferred one of the compounds, 2,5-dichloro-4,6-dinitrophenyl crotonate, amounts to 6850 mg/kg of the body weight of mouse.

The compounds of the present invention can be formulated to various types of fungicidal compositions such as dusts, solutions, emulsifiable concentrates, and wettable powders by formulating with the conventional carriers, wetting agents and adherents.

In order to control the above-mentioned harmful fungal organisms the compounds per se or a diluted composition containing one or more of the compounds may be applied directly to the aerial part of the crop plants in the case of occurence of the fungal diseases or in possible case therefor.

In order to describe the invention more completely, the following examples are provided by way of illustration, but it is not intended that the scope of the invention be limited thereto.

EXAMPLE 1

Preparation of 2,5-Dichloro-4,6-dinitrophenyl Propionate

To a solution of 7 g. of 2,5-dichloro-4,6-dinitrophenol in 50 ml of benzene are added 2.6 g. of propionic acid chloride to react; the reaction mixture is refluxed for 6 hrs. Then the mixture is cooled to room temperature, washed with water, an aqueous sodium carbonate solution and water in this order. The benzene layer is separated, dried on anhydrous sodium sulfate. When the benzene is distilled off yellow solid matter is obtained. The solid is recrystallized from a mixture of n-hexane and benzene: pale yellow needles of m. pt. 56 – 7° C; yield 84.1 percent.

Analytical data:

|  | $C_9H_6O_6N_2Cl_2$ | | | |
|---|---|---|---|---|
|  | C % | H % | N % | Cl % |
| found | 35.27 | 2.03 | 8.95 | 21.87 |
| calcd. | 34.98 | 1.96 | 9.06 | 22.95 |

EXAMPLE 2

Preparation of 2,5-Dichloro-4,6-dinitrophenyl Propionate

One drop of conc. $H_2SO_4$ is added to a mixture of 10 g. of 2,5-dichloro-4,6-dinitrophenol and 13 g. of propionic acid anhydride. The reaction mixture is heated for 5 hrs. at 100° C. After cooling the reaction mixture to room temperature it is poured into a large volume of ice-water with vigorous agitation. The separated pale yellow solid is filtered, dried in a desiccator and recrystallized from a mixture of n-hexane and benzene: pale yellow needles; m. pt. 56 – 7° C; yield 88.3 percent.

M. pt. of the mixture with the sample of Example 1 is 56 – 7° C, showing thus the identity.

EXAMPLE 3

Preparation of 2,5-Dichloro-4,6-dinitrophenyl Methacrylate 91–

To a solution of 25.3 g. of 2,5-dichloro-4,6-dinitrophenol in 50 ml. of toluene 10.5 g. of methacrylic acid chloride are added dropwise at room temperature. The mixture is then heated for 2 hrs. at 100° C. It is then cooled to room temperature, washed with water, 1-N sodium hydroxide solution and water in this order. The benzene layer is separated, and dried on anhydrous sodium sulfate. The pale yellow solid which is obtained when the benzene is distilled off is recrystallized from benzene: colorless prisms; m. pt. 91 – 92° C.; yield 97.5 percent.

Analytical data:

|  | $C_{10}H_6O_6N_2Cl_2$ | | | | |
|---|---|---|---|---|---|
|  | C % | H % | N % | Cl % | weight |
| found | 37.55 | 1.79 | 8.81 | 21.88 | 321.1 |
| calcd. | 37.41 | 1.88 | 8.72 | 22.09 | 321.1 |

EXAMPLE 4

Preparation of 2,5-Dichloro-4,6-dinitrophenyl Methacrylate 13.7 g. of sodium 2,5-dichloro-4,6-dinitrophenolate are suspended in 100 ml. of anhydrous benzene in a reaction flask with agitation. 5.2 g. of methacrylic acid chloride are slowly dropped into the suspension in the flask, while maintaining the content at 20° C. After the addition of the acid chloride the reaction temperature is raised to 80° C and maintained thereat for 3 hrs. under reflux condenser. Then the reaction mixture is cooled to room temperature to separate a solid matter out. The solution, after filtering, is washed with aqueous bicarbonate solution. The benzene layer is separated to leave a residue, which is then recrystallized from benzene: 15.4 g. of colorless prisms with a m. pt. 91 – 92° C. is obtained. It is identified as 2,5-dichloro-4,6-dinitrophenyl methacrylate by co-melting with the sample obtained in Example 3.

EXAMPLE 5

Preparation of 2,5-Dichloro-4,6-dinitrophenyl Crotonate

To a solution of 12.7 g. of 2,5-dichloro-4,6-dinitrophenol in 50 ml. of benzene 6.1 g. of dimethylaniline are added. After cooling the solution to 0° C, a solution of 5.3 g. of crotonic acid chloride in 10 ml. of benzene is slowly dropped to the first solution, while maintaining the reaction temperature to 0° C and stirring. After 8 hrs. of the reaction the reaction mixture is filtered, and the filtrate is washed with aqueous sodium carbonate solution, water, diluted hydrochloric acid and again water. The separated benzene layer is dried on anhydrous sodium sulfate. The solid residue which remains after distilling off the solvent benzene from the benzene layer is recrystalized from n-hexane: light yellow needles; m. pt. 84 – 85° C; yield 98.2 percent.

Analytical data:

| $C_{10}H_6O_6N_2Cl_2$ | | | | | |
|---|---|---|---|---|---|
| | C% | H% | N% | Cl% | Molecular weight |
| | 37.59 | 1.81 | 8.84 | 21.90 | 320.98 |
| calcd. | 37.41 | 1.88 | 8.72 | 22.09 | 321.07 |

EXAMPLE 6

Preparation of 2,5-dichloro-4,6-dinitrophenyl Methacrylate

To a mixture of 12.6 g. of 2,5-dichloro-4,6-dinitrophenol, 4.3 g. of methacrylic acid and 100 ml. of carbon tetrachloride, 3.5 g. of phosphorous trichloride are dropped while maintaining the mixture at room temperature. The mixture is then heated for 2 hrs. under refluxing, and cooled to room temperature. After washing with an aqueous bicarbonate solution and water, carbon tetrachloride is distilled from the organic layer. The remaining solid is recrystallized from benzene; colorless prisms; m. pt. 91 – 92° C.; yield 98.5 percent. The crystal is identified by co-melting with the product of Example 3.

EXAMPLE 7

Preparation of Several Analogous Compounds

In the manner analogous to the aforementioned Examples, the following compounds are obtained:

| Chemical compound | Melting point, °C. |
|---|---|
| 2,5-dichloro-4,6- | |
| dinitrophenyl acrylate | 58–59 |
| " butyrate | 44–45 |
| " tetrolate | 110–111 |
| " sorbate | 94–95 |
| " palmitate | 73–74 |
| " 4'-chlorobenzoate | 108–109 |
| " 2',4'-dichlorobenzoate | 136–137 |
| " salicylate | 73–74 |
| " 4'-aminobenzoate | 125 |
| " 4'-acetaminobenzoate | 185 |
| " 3',5'-dinitrobenzoate | 173–174 |
| " pentachloro-phenylacetate | 203–205 |
| " cinnamate | 125–126 |
| 3,4-dichloro-2,6-dinitrophenyl crotonate | 137–138 |
| " methacrylate | |
| 2,4,5,6-tetrachloro-3-nitrophenyl propionate | 60–62 |

EXAMPLE 8

Preparation of Wettable Powder 50 parts of 2,5-dichloro-4,6-dinitrophenyl acrylate, 45 parts of diatomaceous earth and 5 parts, as a wetting agent, of sodium dodecylbenzenesulfonate are mixed well in a ball mill to make a wettable powder. The powder is diluted with water to be ready for spraying onto crop plants to be protected from harmful fungi.

EXAMPLE 9

Preparation of Wettable Powder 50 parts of 2,5-dichloro-4,6-dinitrophenyl methacrylate of one of the Example 3, 4 and 5, 45 parts of diatomaceous earth and 5 parts, as a wetting agent, of calcium dodecylbenzenesulfonate are mixed well in a ball mill to form a wetting powder. The powder is, if necessary, diluted with water, applied onto the crop plants to be protected from harmful phytopathogenic organisms.

EXAMPLE 10

Preparation of Dusting Powder 5 parts of 2,5-dichloro-4,6-dinitrophenyl methacrylate, 1 part of calcium stearate and 94 parts of benthonite are well mixed and ground in a mortar to make a dusting powder. The powder may be dusted onto crop plants to be protected from harmful phytopathoyenic organisms, especially Pyricularia oryzae.

EXAMPLE 11

Preparation of Emulsive Concentrate 5 parts of 2,5-dichloro-4,6-dinitrophenyl methacrylate and 5 parts of 2,5-dichloro-4,6-dinitrophenyl-2'-aminobenzoate are dissolved in 80 parts of a solvent, for instance, a mixture of acetone and benzene. 10 parts of an emulsifying agent, for instance, sodium dodecylbenzenesulfonate are added to the aforementioned solution to make an emulsive concentrate. The concentrate is diluted with water ready for spraying onto crop plants to be protected.

EXAMPLE 12

Preparation of Dusting Powder 5 parts of 2,5-dichloro-4,6-dinitrophenyl crotonate, 1 part of calcium stearate and 94 parts of bentonite are mixed together and ground in a grinder to obtain a dusting powder. The powder may be directly dusted onto crop plants to be protected from harmful phytopathogenic organisms.

EXAMPLE 13

Preparation of Wetting Powder 50 parts of 2,4,5,6-tetrachloro-3-nitrophenyl propionate, 45 parts of diatomaceous earth and 5 parts of sodium dodecylbenzenesulfonate are mixed well to obtain a wetting powder. The powder, if necessary, being diluted with water, is sprayed onto crop plants to be protected from pathogenic fungi.

EXAMPLE 14

Preparation of Dusting Powder 5 parts of micronized 3,4-dichloro-2,6 dinitrophenyl methacrylate are mixed with 95 parts of bentonite in a ball mill to obtain a dusting powder. The powder may be directly applied onto crop plants.

EXAMPLE 15

IN VIVO Efficacy in Controlling Rice Blast Disease and Rice Leafspot Disease An aqueous suspension of a wettable powder of the present invention containing any one of chemical substances of the present invention is sprayed onto rice seedlings of a susceptible variety in four leaf stage, said seedlings being cultivated in pots of 9 cm in diameter under nitrogen-excess fertilizing condition, the dose rate of the said spray being 150 liters per 10 ares.

Four days after the spraying an aqueous suspension of spores of rice blast disease pathogen (Pyricularia oryzae) is sprayed onto the treated seedlings and also onto the untreated seedlings as control.

The seedlings are then incubated for a week at a temperature between 26° C and 28° C., at relative humidity of 95 – 100 percent.

The number (A) of lesions appearing on the leaves of the treated seedlings and the number (B) of those on the leaves of the control are compared after incubation as follows to see the disease-control efficacy of the chemical:

$$Percent\ efficacy = 100 \left(\frac{B-A}{B}\right)$$

The efficacy of controlling the other rice disease (Cochliobolus miyabeanus) is also determined by nearly the same method.

Phytotoxicity of the chemical to the seedlings is also observed.

The results of said experiments with some of the chemicals of the present invention are tabulated in the following Table 1.

TABLE 1

| Compounds | Concentration of the compounds in spray, p.p.m. | P. oryzae | Percent control, C. miyabeanus | Phytotoxicity |
| --- | --- | --- | --- | --- |
| 2,5-dichloro-4,6-dinitrophenyl propionate | 500 | 91.5 | 90.0 | |
| | 250 | 72.4 | 82.4 | |
| 2,5-dichloro-4,6-dinitrophenyl butyrate | 500 | 89.5 | 85.4 | |
| 2,5-dichloro-4,6-dinitrophenyl palmitate | 500 | 91.3 | 84.2 | |
| 2,5-dichloro-4,6-dinitrophenyl acrylate | 500 | 95.4 | 98.4 | |
| | 250 | 87.2 | 92.5 | |
| 2,5-dichloro-4,6-dinitrophenyl methacrylate | 500 | 99.6 | 99.3 | |
| | 250 | 98.7 | 96.5 | |
| 2,5-dichloro-4,6-dinitrophenyl crotonate | 500 | 98.9 | 96.5 | |
| | 250 | 96.5 | 93.4 | |
| 2,5-dichloro-4,6-dinitrophenyl sorbate | 500 | 95.5 | 86.7 | |
| 2,5-dichloro-4,6-dinitrophenyl tetrolate | 500 | 90.2 | 93.3 | |
| | 250 | 65.4 | 70.5 | |
| 2,5-dichloro-4,6-dinitrophenyl-chloropropionate | 500 | 85.4 | 72.1 | |
| 2,5-dichloro-4,6-dinitrophenyl-α-chlorocrotonate | 500 | 75.5 | 70.3 | |
| 2,5-dichloro-4,6-dinitrophenyl-4'-chlorobenzoate | 500 | 85.4 | 79.5 | |
| 2,5-dichloro-4,6-dinitrophenyl-2',4'-dichlorobenzoate | 500 | 91.4 | 90.2 | |
| 2,5-dichloro-4,6-dinitrophenyl-3',5'-dinitrobenzoate | 500 | 93.5 | 87.4 | |
| 2,5-dichloro-4,6-dinitrophenyl-4'-aminobenzoate | 500 | 92.1 | 86.4 | |
| | 250 | 62.3 | 80.2 | |
| 2,5-dichloro-4,6-dinitrophenyl-4'-acetaminobenzoate | 500 | 72.3 | 80.8 | |
| 2,5-dichloro-4,6-dinitrophenyl salicylate | 500 | 92.4 | 85.7 | |
| 2,5-dichloro-4,6-dinitrophenyl-4'-hydroxybenzoate | 500 | 95.3 | 87.8 | |
| 2,5-dichloro-4,6-dinitrophenyl-2'-acetoxybenzoate | 500 | 76.4 | 69.3 | |
| 2,5-dichloro-4,6-dinitrophenyl-4'-acetoxybenzoate | 500 | 72.1 | 65.8 | |
| 2,5-dichloro-4,6-dinitrophenyl phenylacetate | 500 | 94.3 | 81.5 | |
| 2,5-dichloro-4,6-dinitrophenyl cinnamate | 500 | 91.4 | 80.2 | |
| 3,4-dichloro-2,6-dinitrophenyl methacrylate | 500 | 85.6 | 72.3 | |
| 3,4-dichloro-2,6-dinitrophenyl crotonate | 500 | 84.1 | 69.8 | |
| 3,4-dichloro-2,6-dinitrophenyl-2',4'-dichlorobenzoate | 500 | 80.2 | 65.4 | |
| 3,4-dichloro-2,6-dinitrophenyl pentachlorophenylacetate | 500 | 75.4 | 72.8 | |
| 2,4,5,6-tetrachloro-3-nitrophenyl propionate | 500 | 95.3 | 89.7 | |
| 2,4,5,6-tetrachloro-3-nitrophenyl crotonate | 500 | 90.1 | 75.5 | |
| 2,3,5,6-tetrachloro-4-nitrophenyl methacrylate | 500 | 91.3 | 92.4 | |
| 2,3,5,6-tetrachloro-4-nitrophenyl crotonate | 500 | 95.4 | 90.5 | |
| 2,3,5,6-tetrachloro-4-nitrophenyl-2',4'-dichlorobenzoate | 500 | 86.2 | 75.2 | |

EXAMPLE 16

IN VIVO Efficacy in Rice Diseases Control

The dusting powder obtained in Example 10 and those obtained by the same method containing the some other chemicals of the present invention are dusted to the rice seedlings, at a dose rate of 3 kg. per 10 ares.

The same procedure is performed to see the results as those described in Example 15 in connection with rice disease controlling efficacies of the dusts.

The results of said experiment are tabulated in the following Table 2.

TABLE 2

| Name of the active ingredient in the dust | % Control of P. oryazae | % Control of C. miyabeanus | Phytotoxicity to rice plant |
| --- | --- | --- | --- |
| 2,5-dichloro-4,6-dinitrophenyl methacrylate | 100.0 | 96.5 | — |
| 2,5-dichloro-4,6-dinitrophenyl crotonate | 99.8 | 97.8 | — |
| 2,5-dichloro-4,6-dinitrophenyl Salicylate | 90.2 | 89.1 | — |
| 2,5-dichloro-4,6-dinitrophenyl-2',4'-dichlorobenzoate | 92.4 | 81.5 | — |
| 3,4-dichloro-2,6-dinitrophenyl-methacrylate | 95.4 | 90.2 | — |
| 3,4-dichloro-2,6-dinitrophenyl-crotonate | 85.7 | 88.4 | — |
| 2,4,5,6,-tetrachloro-3-nitrophenyl propionate | 87.2 | 81.3 | — |
| Standard fungicide Phenyl mercuric acetate 20 p.p.m. | 95.3 | 93.2 | — |

EXAMPLE 17

Mammalian Toxicity and Fish Toxicity a. Mammalian toxicity:

Acute oral 50 percent lethal doses of some chemicals of the present invention to mouse is tabulated as follows:

| Chemicals | $LD_{50}$ mg/kg |
| --- | --- |
| 2,5-dichloro-4,6-dinitrophenyl methacrylate | 3660 |
| 2,5-dichloro-4,6-dinitrophenyl crotonate | 6850 |
| 2,4,5,6-tetrachloro-3-nitrophenyl propionate | 4250 | b. Fish toxicity:

Median tolerance limit after 48 hrs. (TLM 48) of some chemicals of the present invention to young carp are shown as follows:

| Chemicals | TLM 48, ppm |
| --- | --- |
| 2,5-dichloro-4,6-dinitrophenyl methacrylate | 18 |
| 2,5-dichloro-4,6-dinitrophenyl crotonate | 17 |
| Sodium pentachlorophenolate (Standard fungicide) | 0.2 |

What is claimed is:
1. A compound of the formula:

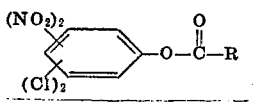

wherein R represents a member of the group consisting of $C_2$–$C_3$ alkyl, $C_2$–$C_5$ alkenyl and $C_3$ alkynyl groups.

2. 2,5-dichloro-4,6-dinitrophenyl methacrylate
3. 2,5-dichloro-4,6-dinitrophenyl crotonate
4. 2,5-dichloro-4,6-dinitrophenyl acrylate
5. 2,5-dichloro-4,6-dinitrophenyl propionate
6. 2,5-dichloro-4,6-dinitrophenyl butyrate
7. 2,5-dichloro-4,6-dinitrophenyl palmitate
8. 2,5-dichloro-4,6-dinitrophenyl tetrolate
9. 2,5-dichloro-4,6-dinitrophenyl sorbate
10. 3,4-dichloro-2,6-dinitrophenyl methacrylate
11. 3,4-dichloro-2,6-dinitrophenyl crotonate
12. 2,4,5,6-tetrachloro-3-nitrophenyl propionate

* * * * *